(12) United States Patent
Gordon et al.

(10) Patent No.: US 9,771,083 B2
(45) Date of Patent: Sep. 26, 2017

(54) COGNITIVE DISPLAYS

(71) Applicant: International Business Machines Corporation, Armonk, NY (US)

(72) Inventors: Michael S. Gordon, Yorktown Heights, NY (US); James R. Kozloski, New Fairfield, CT (US); Peter K. Malkin, Yorktown Heights, NY (US); Clifford A. Pickover, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/986,377

(22) Filed: Dec. 31, 2015

(65) Prior Publication Data

US 2016/0221502 A1    Aug. 4, 2016

Related U.S. Application Data

(63) Continuation of application No. 14/612,064, filed on Feb. 2, 2015.

(51) Int. Cl.
*B60W 40/08* (2012.01)
*B60R 1/00* (2006.01)
(Continued)

(52) U.S. Cl.
CPC ............ *B60W 40/08* (2013.01); *B60R 1/00* (2013.01); *G06K 9/00845* (2013.01);
(Continued)

(58) Field of Classification Search
CPC .... A61B 5/18; B60R 1/00; B60R 1/08; B60R 2001/1253; B60R 2300/802;
(Continued)

(56) References Cited

U.S. PATENT DOCUMENTS 4,793,690 A    12/1988   Gahan et al.
7,551,987 B2    6/2009   Ota
(Continued)

FOREIGN PATENT DOCUMENTS

WO    WO2011028686 A1    3/2011
WO    WO2011155878 A1    12/2011
WO    WO2013073745 A1    5/2013

OTHER PUBLICATIONS

Rho et al., "Automatic Mirror Adjustment System Using a Driver's Pupils," Intelligent Vehicle Symposium, 2002, IEEE, vol. 1, pp. 251-258, Jun. 2002.
(Continued)

*Primary Examiner* — Qutbuddin Ghulamali
(74) *Attorney, Agent, or Firm* — Yeen C. Tham; Otterstedt, Ellenbogen & Kammer, LLP

(57) ABSTRACT

A cognitive mirror apparatus includes an imaging device configured to capture a plurality of images, a controller configured to determine a cognitive state of a user; and a cognitive mirror configured to display a virtual reflection comprising one or more of the plurality of images, wherein the virtual reflection of the cognitive mirror is determined using the cognitive state of a user.

14 Claims, 6 Drawing Sheets

(51) Int. Cl.
  *G06K 9/00* (2006.01)
  *B60R 1/12* (2006.01)
(52) U.S. Cl.
  CPC ............... *B60R 2001/1253* (2013.01); *B60R 2300/8026* (2013.01); *B60W 2040/0818* (2013.01)
(58) Field of Classification Search
  CPC ...... B60R 2300/806; B60R 2300/8066; B60R 2300/8026; G08G 1/09623; G08G 1/167; H04N 7/181
  USPC ............................................. 340/576, 573.7
  See application file for complete search history.

(56) References Cited

U.S. PATENT DOCUMENTS

| | | | |
|---|---|---|---|
| 7,658,521 B2 | 2/2010 | DeLine et al. | |
| 8,670,035 B2 | 3/2014 | Robert | |
| 8,698,639 B2* | 4/2014 | Fung | B60K 28/06 340/576 |
| 9,041,806 B2* | 5/2015 | Baur | B60R 1/00 340/903 |
| 2007/0115133 A1 | 5/2007 | Boverie | |
| 2008/0030313 A1* | 2/2008 | Obradovich | B60C 23/04 340/439 |
| 2012/0212353 A1* | 8/2012 | Fung | B60K 28/06 340/905 |
| 2012/0316793 A1* | 12/2012 | Jung | A61B 5/04842 702/19 |
| 2013/0147953 A1* | 6/2013 | Rao | B60R 1/00 348/148 |
| 2013/0201335 A1 | 8/2013 | Heinemann | |
| 2013/0215274 A1 | 8/2013 | Son et al. | |
| 2013/0229522 A1* | 9/2013 | Schofield | B60C 23/00 348/148 |
| 2013/0286193 A1 | 10/2013 | Pflug | |
| 2014/0063231 A1 | 3/2014 | Brester | |
| 2014/0285666 A1* | 9/2014 | O'Connell | B60R 1/00 348/148 |

OTHER PUBLICATIONS

Hurwitz et al., "Backing collisions : a study of drivers' eye and backing behaviour using combined rear-view camera and sensor systems," Injury Prevention Apr. 2010, pp. 79-84 (NIH Public Access, pp. 1-16).

Michael S. Gordon et al., Unpublished U.S. Appl. No. 14/612,064, filed Feb. 2, 2015, Cognitive Displays, pp. 1-19 and 6 sheets of drawings.

List of IBM Patents or Applications Treated as Related.

State IP Office of the PR China, ISR and Written Opinion for PCT Application No. PCT/IB2016/050360, May 27, 2016, 12 pages total.

* cited by examiner

COGNITIVE DISPLAYS

CROSS-REFERENCE TO RELATED APPLICATION

This application is a continuation of U.S. patent application Ser. No. 14/612,064 filed Feb. 2, 2015, the complete disclosure of which is expressly incorporated herein by reference in its entirety for all purposes.

BACKGROUND

The present disclosure relates to display technology, and more particularly to a display having changeable content and characteristics.

Driver aids are increasingly common in vehicles. These include information displays and notifications to improve the safety of the driver. These driver aids typically require a response by the user and are thus passive type devices.

BRIEF SUMMARY

According to an exemplary embodiment of the present invention, a cognitive mirror apparatus includes an imaging device configured to capture a plurality of images, a controller configured to determine a cognitive state of a user, and a cognitive mirror configured to display a virtual reflection comprising one or more of the plurality of images, wherein the virtual reflection is determined using the cognitive state of a user.

BRIEF DESCRIPTION OF THE SEVERAL VIEWS OF THE DRAWINGS

Preferred embodiments of the present invention will be described below in more detail, with reference to the accompanying drawings.

DETAILED DESCRIPTION

According to an exemplary embodiment of the present invention, a cognitive display or cognitive mirror (used herein interchangeably) apparatus is configured to adjust one or more view and/or image properties. The adjustments are selected to aid a user (e.g., a driver, security guard, hospital worker) in a differential manner depending on a cognitive state of the user. The cognitive mirror can be implemented as a stand-alone solution or to supplement another mirror (e.g., a traditional side-view mirror used on a truck).

In one or more embodiments, a cognitive mirror apparatus 100 includes a cognitive mirror 101 and a video imaging device 102. The cognitive mirror displays a view captured by the video-imaging device (e.g., a video camera). The view may not be visible by the user using traditional mirrors (e.g., rearward of a vehicle).

Figure 1:
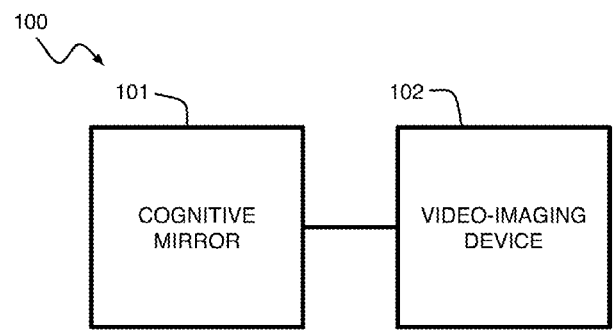
FIG. 1 is a block diagram of a cognitive mirror apparatus according to an exemplary embodiment of the present invention.
Figure 2:
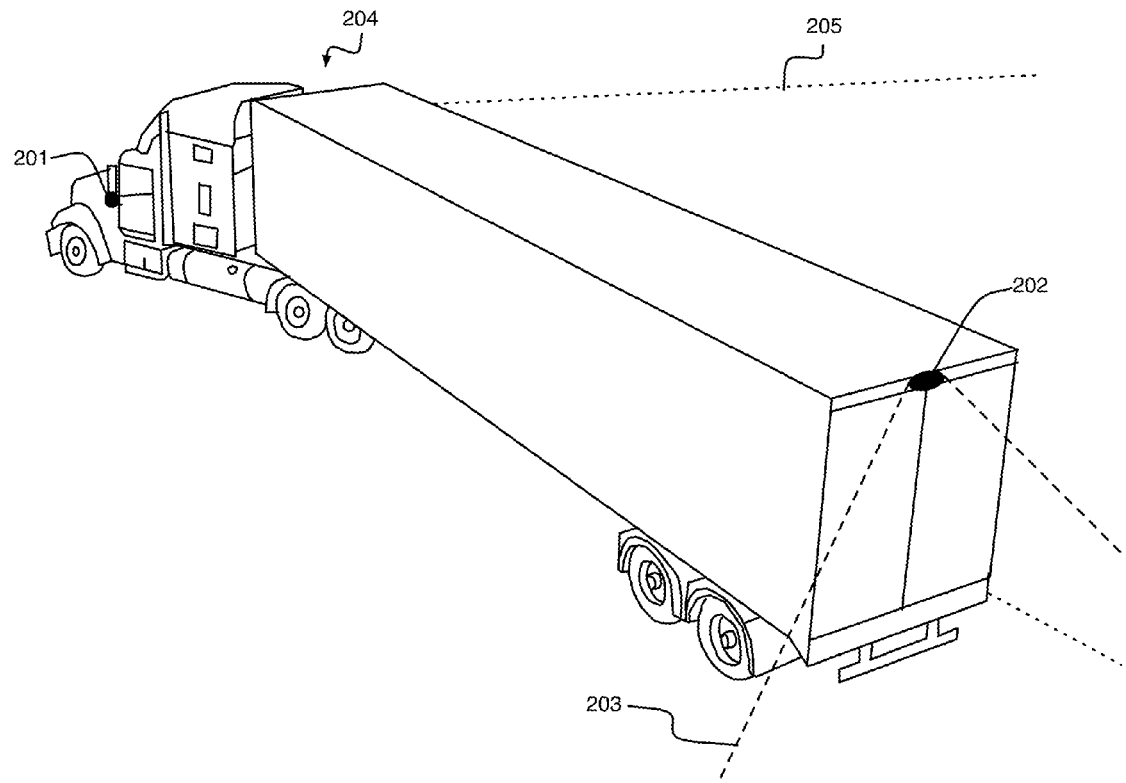
FIG. 2 is a view of a truck including cognitive mirror apparatus according to an exemplary embodiment of the present invention.
Figure 3:
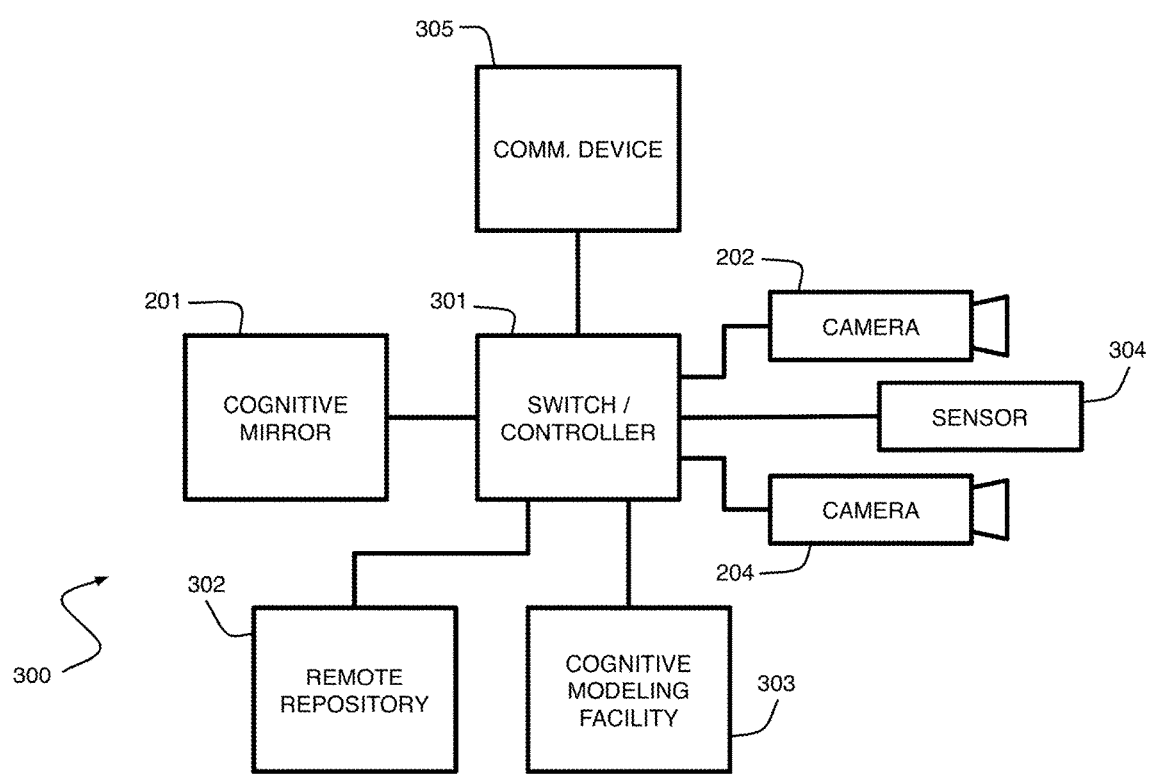
FIG. 3 is a block diagram of a cognitive mirror apparatus including switch/controller according to an exemplary embodiment of the present invention.

According to an exemplary embodiment of the present invention, an apparatus generates an image of one or more areas around (e.g., to the side and rear of) a vehicle. With reference to FIG. 2 and FIG. 3, the cognitive mirror apparatus 300 includes a weather resistance cognitive mirror 201 located outside of the vehicle (e.g., on a lower portion of a side mirror). In this example, a first camera 202 is located on the rear of a trailer in a center mounted position having a first view 203, while a second camera 204 (implied by not explicitly shown) is located on a passenger side near the front of the vehicle having a second view 205 so that a view of the entire side of the vehicle can be generated in the cognitive mirror 201. In one or more embodiments, the cameras can be equipped with fixed wide-angle lenses.

A video signal from each camera (202/204) is transmitted to a switch/controller 301. The switch/controller 301 controls an image displayed by the cognitive mirror 201, for example to display an image corresponding to each signal for a pre-determined time or allow for a manual selection of any one of the cameras. The switch/controller 301 can determine a cognitive state of a user. The cognitive state can be determined using sensors for evaluating different parameters including eye movement, facial expression, posture, pulse, etc. Examples of the cognitive state include, for example, a normal state associated with one or more parameters in a predetermined normal range (e.g., normal pulse and eye movement), a preparative state associated with a shifting gaze in a particular direction such as in preparing to change lanes, etc. In such a manner the driver can look at the cognitive mirror 201 in order to see one or more additional outward views of the vehicle depending on his cognitive state, increasing safety and reducing a need to look in various directions to check for obstructions while backing up or changing lanes. For example, the image displayed by the cognitive mirror 201 can correspond to a preparative state associated gaze direction.

According to an exemplary embodiment of the present invention, the switch/controller 301 determines parameters related to the user. In the example of a driver, these parameters can include general parameters such as a measure of driving ability, average level of distraction, etc., and specific parameters including the length of the current trip, weather, etc. The switch/controller 301 can adjust display parameters using the parameters of the driver.

The parameters of the user can be determined from the camera's 202/204 and other sensors 304 (e.g., a speedometer of the vehicle, heart rate of the user captured from a user's heart rate monitor, etc.).

In addition, the parameters of the user may be stored and retrieved from a remote repository 302 or cognitive modeling facility 303, for example, a driver's smart phone or activity monitor, or a cloud based cognitive interface management facility. In one or more embodiments of the present invention, the parameters of the driver are translated into one or more display parameters using a configurable mapping. The configurable mapping can be provided by the vehicle manufacturer, a regulatory body, a cognitive modeling and management service, the user, etc. In one example, the mapping relates a parameter of the driver (e.g., a level of driver distraction) to a shape of the cognitive mirror (e.g., convexity/concavity), either in a virtual or physical implementation. In another example, the parameter of the driver can include a level of driver reaction to backlighting/highlighting of objects in the cognitive mirror or an age of the driver, which can be used by the switch/controller 301 to control an angle of the cognitive mirror. In yet another example, a driver's driving experience is mapped to cognitive mirror attentional signals, such as a flashing alert when the cognitive mirror should be checked.

Adjustments in the display parameters can be made iteratively, sampling the user's cognitive state to convergence (e.g., on a threshold for confidence). For example, a cognitive mirror can adjust to a driver's point of view by iteratively making adjustments in the display parameters until the driver is judged to respond appropriately to surrounding vehicles or traffic (e.g., indicating that the cognitive mirror has reduced any blind spot in the driver's view). The determination of driver seeing the surrounding vehicles may be ascertained by analysis of driving behavior, looking back behavior, and eye movements. In one example, a virtual reflection displayed by the cognitive mirror can be adjusted for dazzle control based on an assessment of the cognitive state of the user (i.e., determine whether the user is squinting in a predominately low light environment as an indication of the cognitive state of being blinded by lights). In this case, the predominately low light environment can be determined based on time of day and the date (i.e., whether it is after dusk).

Figure 4:
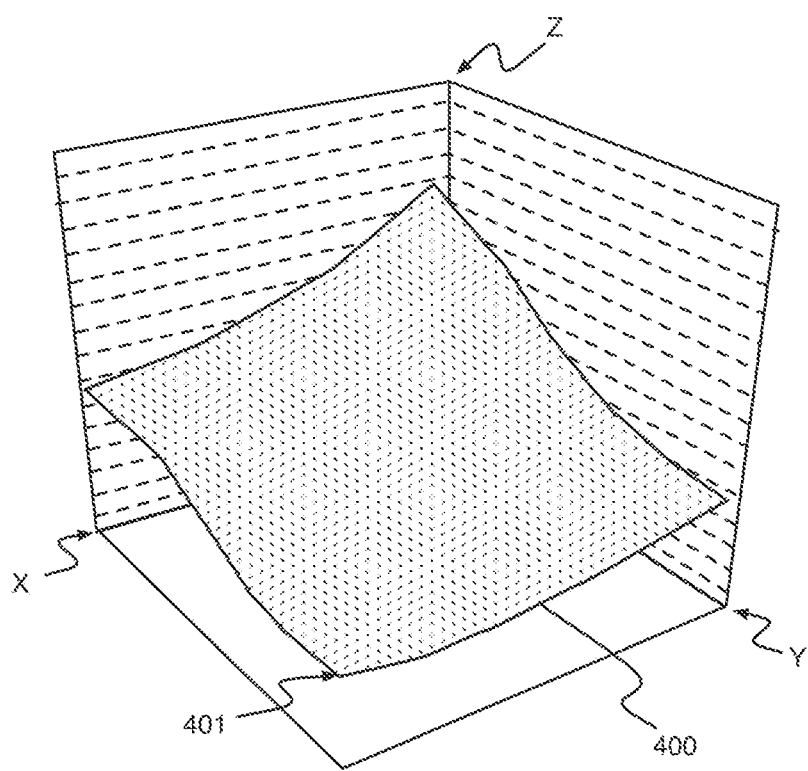
FIG. 4 illustrates an exemplary mapping function according to an exemplary embodiment of the present invention.

FIG. 4 shows an exemplary configurable mapping 400 as a multidimensional parameter mapping relating cognitive parameters on X, Y axes to a mirror parameter in a Z axis. For example, X and Y axes can correspond to a level of driver distraction and a length of a current trip, while the Z axis corresponds to a threshold for displaying an attentional signal, such that as levels of X and Y increase, the threshold for displaying an attentional signal decreases (e.g., to point 401).

In one exemplary implementations, in the case of a parked vehicle, the cognitive mirror can display a zoomed image of the driver, depending on for example, the proximity of the driver to the mirror. In one example, the cognitive mirror apparatus can determine that the driver is moving towards the cognitive mirror and as a result display a zoomed image of the driver. In this case the cognitive mirror apparatus perceives a need of the driver (e.g., a close up view), and displays a zoomed view. In another exemplary implementation, the cognitive mirror can display a calendar, and as the user draws neared the cognitive mirror, the display can zoom on an area of the calendar determined to be of interest to the user, e.g., based on eye movement.

The cognitive mirror apparatus can learn based on aggregate experience of many users in relation to correlations among properties, captured incidents, frequency of activity, etc.

Figure 5:
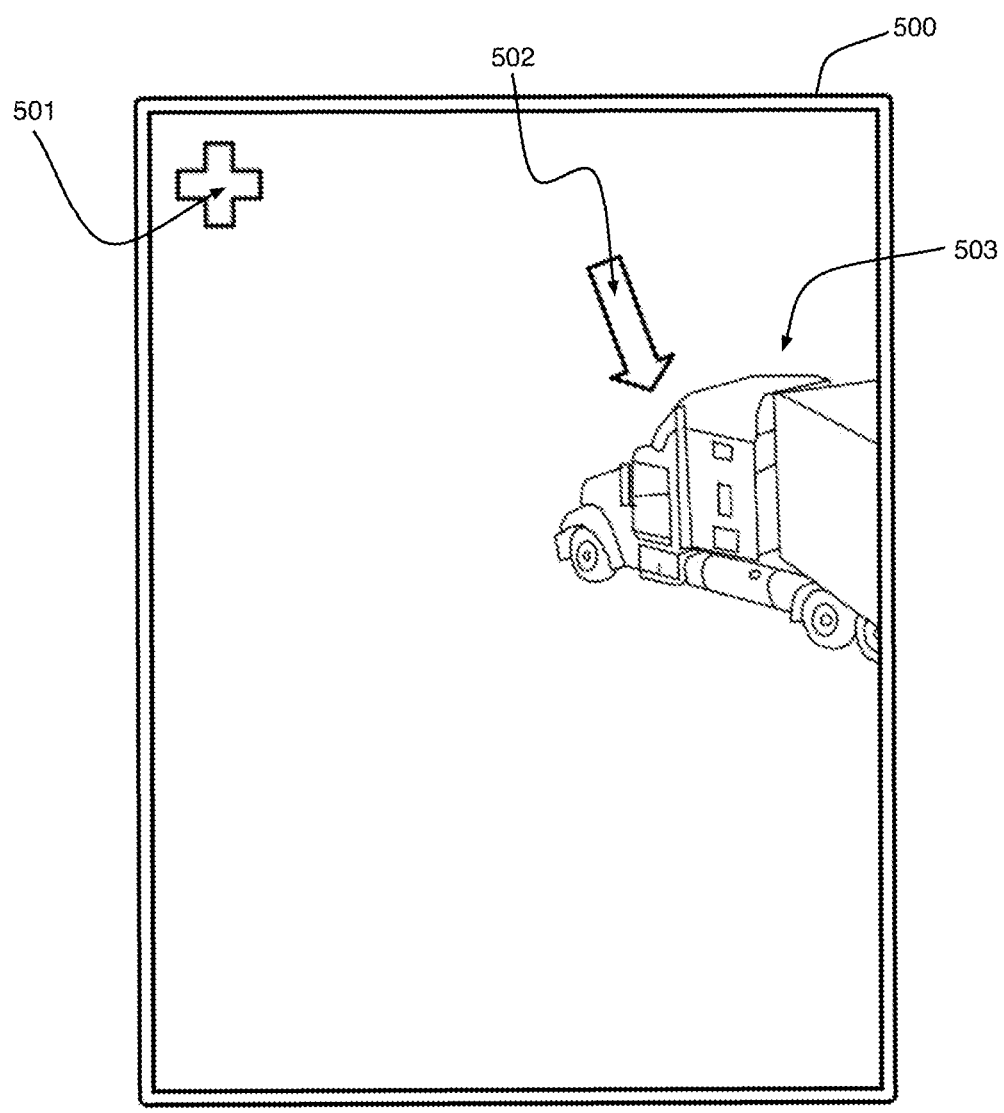
FIG. 5 is an exemplary illustration of a cognitive mirror and virtual reflection according to an exemplary embodiment of the present invention.

In another embodiment, the content and characteristics of the cognitive mirror change depending on perceived cognitive states of individuals in the vicinity of the user, for example, based on a level of traffic congestion. These individuals can include, for example, cyclists, pedestrians, motorcycles, drivers of cars, etc. located around the user's vehicle. In this embodiment, the content and characteristics of the cognitive mirror can include a demarcation of vehicle within a radius R, e.g., by an outline around the vehicle in the display of the cognitive mirror, a change in brightness of the cognitive mirror, an arrow pointing to the vehicle in the display of the cognitive mirror, a change in view or perspective that makes the vehicle more apparent in the display of the cognitive mirror, etc. The demarcation of a vehicle in a specific region of the cognitive mirror includes an estimation based on a driver's eye movement, the angle of the cognitive mirror, and the location of an object (e.g., the vehicle being marked) imaged. For example, FIG. 5 shows an illustration of a cognitive mirror and virtual reflection 500 according to an exemplary embodiment of the present invention in which an attentional signal 501 (e.g., a flashing alert) is displayed, together with a demarcation 502 of a vehicle 503 captured by a video-imaging device and displayed as in the virtual reflection 500.

The cognitive state of the individuals in the vicinity of the user can be estimated with confidence C according to, for example, perceived driving patterns, vehicle type, perceived distraction level, biometric inputs (e.g., information gained from other drivers, such as state of attentiveness of their driving based on following their eyes using eye trackers, clenching of the steering wheel, volume of noise in cars, a tendency to drift from the road with an attempt to recover, other indicators of fatigue or anger, etc.), arousal state (e.g., distractions caused by additional occupants in a nearby vehicle), real-time video of another driver's face and eyes, etc. This video can be anonymized so that the video remains private.

According to an exemplary embodiment of the present invention, a communication device 305 (see FIG. 3) of the cognitive mirror apparatus 300 shares driver cognitive states among cognitive mirror apparatus in a vicinity of the user's vehicle (e.g., within about 150 feet of the user's vehicle or within about 5 seconds of the user's vehicle given vector data) implemented in vehicles on the road. The sharing of cognitive states through communication devices (e.g., 305) facilitates identification in a cognitive mirror of a vehicle driven by a driver in a particular cognitive state. A demarcation can then include information about the cognitive state of an operator of a vehicle imaged in the cognitive mirror. In one or more embodiments, the cognitive mirror can share video information with other vehicles on the road. For example, a PIP (picture in picture) display can show a view obtained from a vehicle directly behind the user's vehicle. In this way, information about more distant traffic conditions (e.g., obstructed by other vehicles) can be made available to the driver. PIP's can be recursive to allow additional views of even more distant road conditions.

According to one or more embodiments of the present invention, the communication device 305 is a component of a network connecting a plurality of cognitive mirror apparatus in the vicinity of the user's vehicle. In one example, the network is configured as with central or star data flow topology, with the communication device 305 functioning as a hub. In another example the network is configured as a peer-to-peer network, with the communication device 305 function as a peer.

According to an exemplary embodiment of the present invention, video content is stored. Stored video content can be played back at a later time, for example, for educational purposes.

In one or more exemplary embodiments, a cognitive mirror apparatus is implemented on vehicles including aircraft, motorcycles or bicycles, in indoor applications such as hospitals and secure environments wherein dome or drop-in cognitive mirrors can draw a user's attention (e.g., by a visual attentional signal or alert notification) to an approaching object around a corner, possibly based on a perceived speed of the object so as to avoid collisions. In another example embodiment, a virtual cognitive mirror can be implemented in an Augmented Reality (AR) environment. The virtual cognitive mirror can be useful in medical devices that currently make use of mirrors, including dental mirrors, speculums, and certain cognitive tests.

In one or more exemplary embodiments, a cognitive mirror apparatus is implemented in a virtual environment such as a video game, tutorial, training simulator, etc. For example, a cognitive mirror in a virtual vehicle can change contents and characteristics depending on the cognitive state of user.

Figure 6:
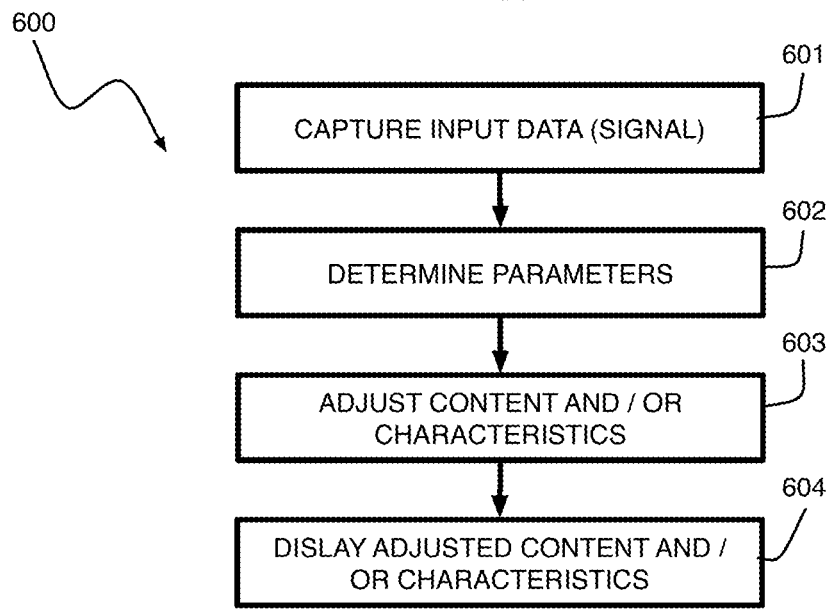
FIG. 6 is a flow diagram of a method according to an exemplary embodiment of the present invention.

By way of recapitulation, according to an exemplary embodiment of the present invention, FIG. 6 shows a method 600 for operating a cognitive mirror apparatus including capturing input data 601 including video signals from one or more input devices (e.g., cameras, sensors, etc.), determining parameters of the cognitive mirror 602 based on the captured input data (e.g., using a cognitive state of a user), adjusting content and/or characteristics of the cognitive mirror 603 (e.g., changing an alignment, adding attentional information, zooming, etc.) and displaying a virtual reflection comprising an image corresponding to the adjusted content and/or characteristics on the cognitive mirror 604. The adjustments can include changes in the content and characteristics of the cognitive mirror, including convexity/concavity, alignment, brightness, contrast, headlight dazzle control, input from displayed video cameras, etc. The cognitive/context parameters can include context of area around a vehicle, the user's sightlines, speed of the vehicle, characteristics of the vehicle, characteristics of the user (e.g., whether or not the driver is wearing sunglasses, pupil dilation, tiredness, and distraction), etc.

The methodologies of embodiments of the disclosure may be particularly well-suited for use in an electronic device or alternative system. Accordingly, embodiments of the present invention may take the form of an entirely hardware embodiment or an embodiment combining software and hardware aspects that may all generally be referred to herein as a "processor," "circuit," "module" or "system."

Furthermore, it should be noted that any of the methods described herein can include an additional step of providing a cognitive mirror apparatus including a cognitive mirror (e.g., 201), a switch/controller 301, and input devices (e.g., a camera 202 and sensor 304). Further, a computer program product can include a tangible computer-readable recordable storage medium with code adapted to be executed to carry out one or more method steps described herein, including the provision of the system with the distinct software modules.

Figure 7:
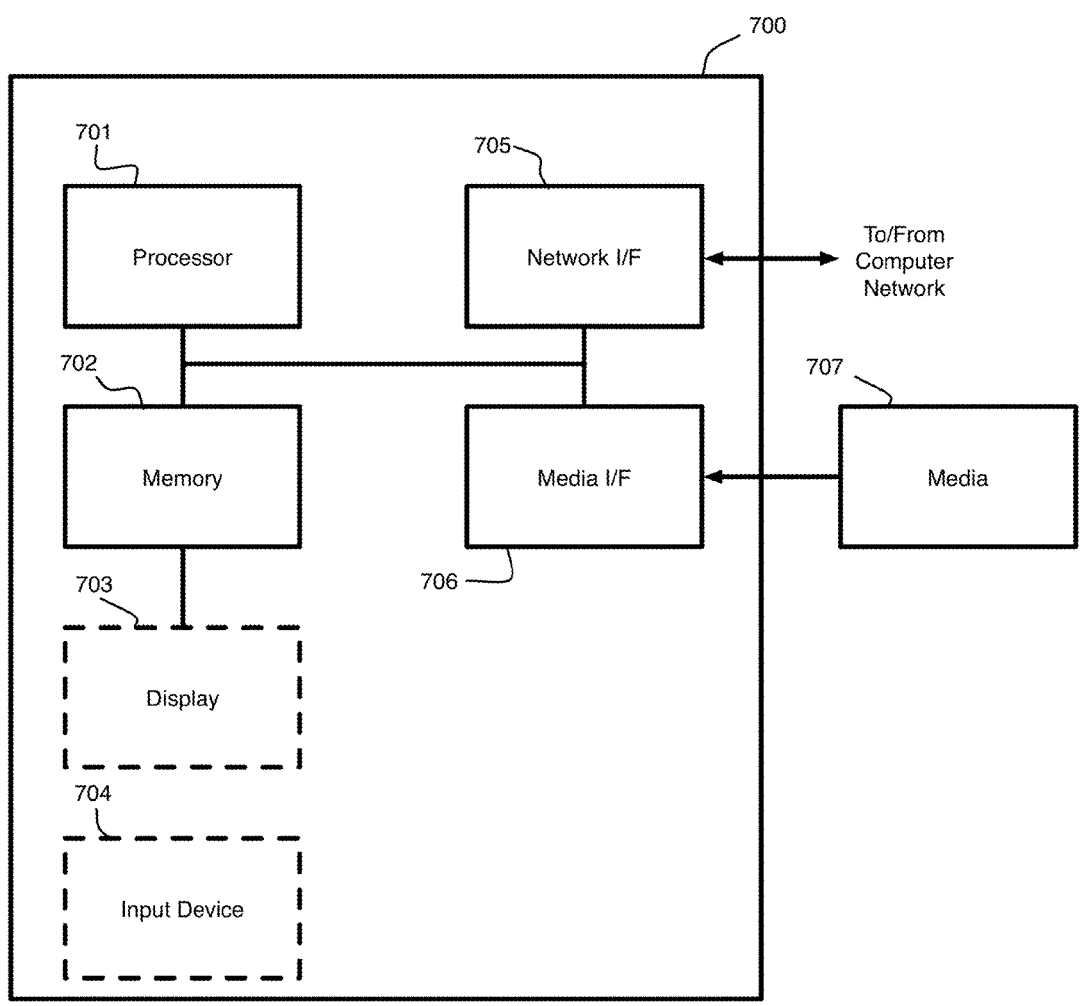
FIG. 7 is a diagram of a computer system configured to perform the operations of a cognitive mirror apparatus according to an exemplary embodiment of the present invention.

Referring to FIG. 7; FIG. 7 is a block diagram depicting an exemplary computer system embodying a cognitive mirror apparatus 300 (see FIG. 3) according to an embodiment of the present invention. The computer system shown in FIG. 7 includes a processor 701, memory 702, display 703, input device 704 (e.g., keyboard), a network interface (I/F) 705, a media IF 706, and media 707, such as a signal source, e.g., camera, Hard Drive (HD), external memory device, etc.

In different applications, some of the components shown in FIG. 7 can be omitted. The whole system shown in FIG. 7 is controlled by computer readable instructions, which are generally stored in the media 707. The software can be downloaded from a network (not shown in the figures), stored in the media 707. Alternatively, software downloaded from a network can be loaded into the memory 702 and executed by the processor 701 so as to complete the function determined by the software.

The processor 701 may be configured to perform one or more methodologies described in the present disclosure, illustrative embodiments of which are shown in the above figures and described herein. Embodiments of the present invention can be implemented as a routine that is stored in memory 702 and executed by the processor 701 to process the signal from the media 707. As such, the computer system is a general-purpose computer system that becomes a specific purpose computer system when executing routines of the present disclosure.

Although the computer system described in FIG. 7 can support methods according to the present disclosure, this system is only one example of a computer system. Those skilled of the art should understand that other computer system designs can be used to implement embodiments of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A cognitive mirror apparatus comprising:
    an imaging device configured to capture a plurality of images;
    a sensor capturing one or more parameters indicative of a cognitive state of a user including at least one of eye movement, facial expression, posture, and pulse;
    a cognitive mirror configured to display a virtual reflection comprising one or more of the plurality of images adjusted by an application of adjustments in a controllable parameter of the cognitive mirror; and
    a controller configured to determine the cognitive state of the user using the one or more parameters, wherein the sensor communicates the one or more parameters indicative of the cognitive state of the user to the controller, and wherein the controller includes a mapping relating the one or more parameters indicative of the cognitive state of the user to the controllable parameter of the cognitive mirror, and wherein the controller is further configured to sample the one or more parameters indicative of the cognitive state of the user to convergence on a threshold for confidence, while iteratively applying the adjustments in the controllable parameter of the cognitive mirror.

2. The cognitive mirror apparatus of claim 1, wherein the controllable parameter of the cognitive mirror is one of a shape of the cognitive mirror, an angle of the cognitive mirror relative to the user, and wherein the controller uses the mapping to select a value of the controllable parameter.

3. The cognitive mirror apparatus of claim 1, wherein the controllable parameter of the cognitive mirror is one of a modification and augmentation of the virtual reflection, and wherein the controller uses the mapping to select a value of the controllable parameter.

4. The cognitive mirror apparatus of claim 3, wherein the augmentation of the virtual reflection includes an alert.

5. The cognitive mirror apparatus of claim 3, wherein the modification of the virtual reflection includes a zoomed portion of the virtual reflection, a brightness of the virtual reflection, contrast of the virtual reflection, headlight dazzle control for a vehicle imaged in the virtual reflection.

6. The cognitive mirror apparatus of claim 1, further comprising a communication device receiving data indicative of a cognitive state of an operator in a vicinity of the user.

7. The cognitive mirror apparatus of claim 1, wherein the controller is disposed in a vehicle and is configured to determine a state of the vehicle, and wherein the controller includes a mapping relating the state of the vehicle to a controllable parameter of the cognitive mirror.

8. A cognitive mirror apparatus comprising:
   an imaging device capturing a plurality of images;
   a sensor capturing data indicative of a cognitive state of a user;
   a controller, receiving the data indicative of the cognitive state of the user from the sensor, determining the cognitive state of the user using the data indicative of the cognitive state of the user, estimating a confidence C for the cognitive state of the user, and mapping the data indicative of the cognitive state of the user to a controllable parameter; and
   a cognitive mirror displaying a virtual reflection, the virtual reflection comprising one or more of the plurality of images adjusted using the controllable parameter mapped by the controller to the data indicative of the cognitive state of the user,
   wherein the controller iteratively receives the data indicative of the cognitive state of the user from the sensor, determines the cognitive state of the user using the data indicative of the cognitive state of the user, estimates the confidence C for the cognitive state of the user, and maps the data indicative of the cognitive state of the user to the controllable parameter adjusting the virtual reflection, until the confidence C for the cognitive state of the user converges with a threshold.

9. The cognitive mirror apparatus of claim 8, wherein the controllable parameter is one of a shape of the cognitive mirror, an angle of the cognitive mirror relative to the user.

10. The cognitive mirror apparatus of claim 8, wherein the controllable parameter is one of a modification and augmentation of the virtual reflection.

11. The cognitive mirror apparatus of claim 10, wherein the augmentation of the virtual reflection includes an alert.

12. The cognitive mirror apparatus of claim 10, wherein the modification of the virtual reflection includes a zoomed portion of the virtual reflection, a brightness of the virtual reflection, contrast of the virtual reflection, headlight dazzle control for a vehicle imaged in the virtual reflection.

13. The cognitive mirror apparatus of claim 8, further comprising a communication device connecting the controller to a network comprising at least one other communication device and receiving data indicative of a cognitive state of an operator in a vicinity of the user from the least one other communication device.

14. The cognitive mirror apparatus of claim 8, wherein the controller is disposed in a vehicle, the controller determining a state of the vehicle, and wherein the controller includes a mapping relating the state of the vehicle to a controllable parameter of the cognitive mirror.

* * * * *